United States Patent
Aalto et al.

(10) Patent No.: US 6,781,954 B1
(45) Date of Patent: Aug. 24, 2004

(54) TRANSFER OF SS7 SIGNALLING MESSAGE CONTENTS OVER PACKET BROADCASTING NETWORK (LAN) FROM MULTIPLE SIGNALLING POINTS TO SINGLE POINT (MULTIPLE POINT-TO-POINT)

(75) Inventors: Petri Aalto, Pirkkala (FI); Timo Takamäki, Tampere (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/481,720

(22) Filed: Jan. 12, 2000

(51) Int. Cl.[7] .............................. H04L 12/28; H04J 3/12
(52) U.S. Cl. ...................... 370/230; 370/409; 370/410; 370/522; 370/242
(58) Field of Search ................................ 370/236, 242, 370/241, 250, 338, 389, 390, 409, 410, 432, 522, 349, 350, 352, 381, 385; 379/22.03, 115.01, 145, 230

(56) References Cited

U.S. PATENT DOCUMENTS

| | | | | |
|---|---|---|---|---|
| 5,268,895 A | * | 12/1993 | Topper ....................... | 370/385 |
| 5,426,688 A | * | 6/1995 | Anand ........................ | 370/385 |
| 5,475,732 A | | 12/1995 | Pester, III ................. | 379/32.01 |
| 5,546,450 A | * | 8/1996 | Suthard et al. ........... | 379/15.04 |
| 5,926,482 A | * | 7/1999 | Christie et al. ............ | 379/230 |
| 6,181,703 B1 | * | 1/2001 | Christie et al. ............ | 370/410 |
| 6,327,350 B1 | * | 12/2001 | Spangler et al. ......... | 379/115.01 |

FOREIGN PATENT DOCUMENTS

EP      0 738 091 A1     10/1996

OTHER PUBLICATIONS

Uberwachungs– und Managementsystem für Netze mit dem Zeichengabesystem Nr. 7 in NTZ Nachrichten Technische Zeitschrift No. 49 (1996) Feb. No. 2, Berlin Germany.

* cited by examiner

*Primary Examiner*—Afsar Qureshi
(74) *Attorney, Agent, or Firm*—Cohen, Pontani, Lieberman & Pavane

(57) ABSTRACT

Methods and apparatus for signal monitoring of messages in a telecommunications network having a plurality of switches and network elements therein alleviate the need for external hardware to be hooked up to nodes of the network to determine whether faults have occurred at the nodes. A signal monitoring application disclosed herein stores related message signals and messages in a relational database wherein messages and signals having common elements can be easily and quickly viewed. The SIMO application cross-references the messages and signals in the relational database according to a transaction table which categorizes and stores the messages according to parameters set out in the transaction table. This allows the messages to be ranked and viewed very quickly without the need to process them and expend valuable computational time and resources.

34 Claims, 3 Drawing Sheets

TRANSFER OF SS7 SIGNALLING MESSAGE CONTENTS OVER PACKET BROADCASTING NETWORK (LAN) FROM MULTIPLE SIGNALLING POINTS TO SINGLE POINT (MULTIPLE POINT-TO-POINT)

BACKGROUND OF THE INVENTION

1. Field of the Invention

This invention relates generally to monitoring message transmission in telephone switches. More specifically, this invention relates to monitoring message transmission in telephone switches with a software-based monitoring system wherein messages are categorized according to a transaction table and messages with the same transaction parameters are stored together.

2. Description of the Related Art

Modern telephone switching systems handle literally millions of landline and wireless phone calls during every minute of the day. These messages are input to the system from thousands of nodes which are at times at great distances from the central hub of the switching system that handles and routes the calls in the phone network. Needless to say, monitoring the messages received at the nodes to verify their accuracy and to ensure that they reach their intended location is a monumental task that must be constantly monitored or the telecommunication system runs the risk of performing poorly or shutting down altogether.

Many modern switches are in existence today which can experience the types of problems briefly outlined above. One such switch is the DX200 switch which is a total, integrated switching solution that is used all over the world. The DX200 architecture is owned and produced by Nokia Corporation, Helsinki, Finland. Prior methods of signal monitoring have typically monitored the messages at the switch elements and in order to monitor signaling in the DX200 switch and other similar switches, external protocol analyzers, which are separate, independent pieces of hardware, must be employed at the nodes to gather and analyze message and signaling data. Such external protocol analyzers are available from, for example, Hewlett-Packard, Palo Alto, Calif. A particularly useful external protocol analyzer is Hewlett-Packard's "acceSS7".

This type of analyzer must be attached to the signaling link or open interface (e.g. the subscriber interface) in the switch. The problem associated with external protocol analyzers of this type is that they are required to be physically attached to nodes in the system. This requires that a person physically travel from place-to-place in the system to perform the required monitoring functions through actual physical connections of the analyzer to the nodes in the system to gather data of suspected faults therein. Of course, this activity can be very time consuming, expensive and difficult when tracking faults and other events in the whole network. Moreover, external protocol analyzers are expensive pieces of equipment that require constant servicing themselves in order to ensure that they perform and correctly yield useful and accurate signaling data for the switch.

Accordingly, there is a long-felt, but unresolved, need in the art for efficient and simple techniques to monitor signal transmission in a telecommunications network, and particularly at the switches or other signaling points thereof. Such techniques should not require the use of any external and superfluous hardware. Furthermore, these techniques should be simple to implement in existing switches and allow for straightforward troubleshooting of the switch without utilizing complex data analysis and reduction techniques.

It would be beneficial if these techniques allowed the faults to be traced quickly and alleviated the inconvenience of physically going to a place in the network where the fault is suspected. Such needs have not heretofore been achieved in the art.

SUMMARY OF THE INVENTION

The systems and methods in accordance with the present invention perform signal monitoring of a message which comprises a signal without the need for use of an external signal monitoring device by incorporating the signal monitoring function in a separate processor which is operable to control signal monitoring. Preferably, the message signals are monitored by a network element or signaling point and it is determined whether a trigger condition for the message signals has occurred. If the trigger has occurred, the processor then collects and stores the message signals for further processing and the message signals are referenced according to parameters set out in a transaction table to process the message signals when the trigger has occurred. More preferably, the referenced message signals are then stored in a database having stored therein other message signals which have been similarly referenced according to the transaction table when a trigger condition has occurred for the other message signals.

The methods and systems of the present invention thus efficiently and cost-effectively perform signal monitoring without the need for external devices to be connected to the system. By performing signal monitoring in accordance with the present invention, the computational costs for signal monitoring are reduced and the signal monitoring function is greatly streamlined. The inventive signal monitoring systems and methods also advantageously provide centralized signal monitoring since the signal monitoring for the entire network may be accomplished at a single network element if desired. Moreover, the inventive signal monitoring methods and systems allow signal monitoring to occur at any signaling point in the network and not just at a switch element thereof. Such results have not heretofore been achieved in the art.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals refer to like elements throughout the several views thereof.

DETAILED DESCRIPTION OF THE PRESENTLY PREFERRED EMBODIMENTS

Figure 1:
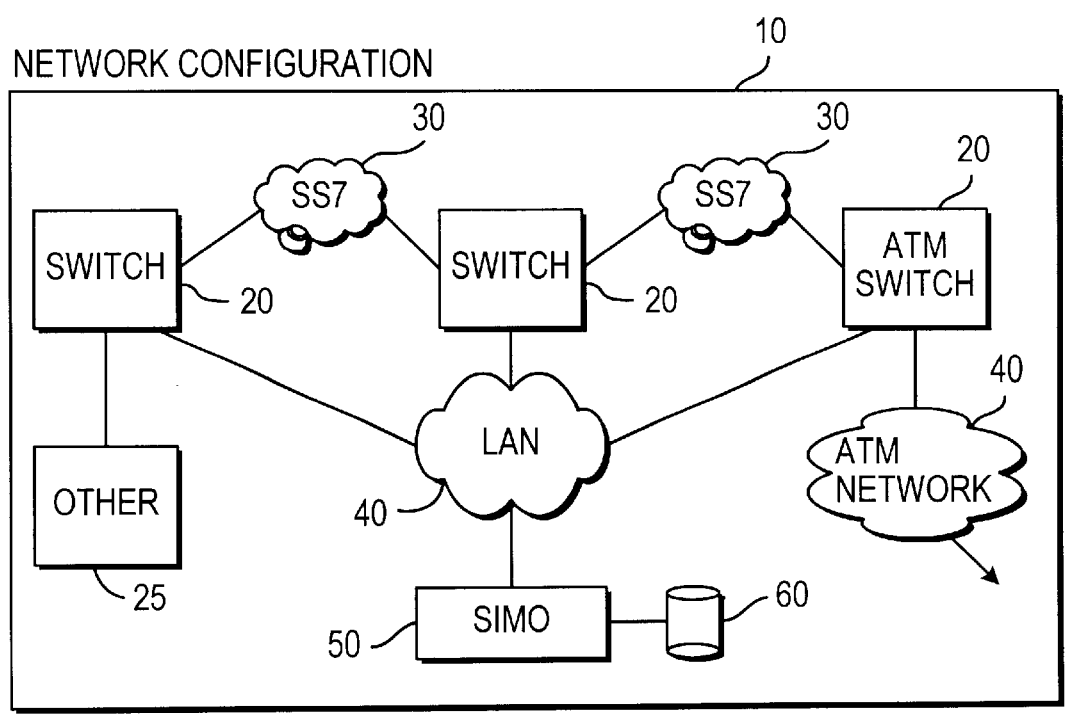
FIG. 1 depicts a block diagram of a network configuration utilizing signal monitoring in accordance with the present invention.

Referring now to the drawings, FIG. 1 depicts a network 10 having a plurality of network elements 20 in which signal monitoring in accordance with the present invention is practiced. The network elements 20 represent signaling points in the network from which signal monitoring in accordance with the present invention can be initiated. The network elements may comprise switches, computers, nodes or other devices known to those skilled in the art through which messages in the network will traverse. In a preferred embodiment, the network elements are switches, for example, the DX200 switch mentioned above, although it will be recognized by those with skill in the art that other switches and network elements may be equally capable of performing the inventive signal monitoring techniques disclosed herein. The invention is not intended to be limited to any particular network element, signaling point or switch. For convenience, the network elements or signaling points 20 will be referred to as switches throughout.

The switches 20 communicate with each other through a known communication protocol depicted by clouds 30. While any communications protocol can be used to signal between switches 20, the "SS7" protocol known to those skilled in the art is a preferred signaling protocol used in accordance with the invention.

The switches 20 are further in communication with a local area network (LAN) 40 which acts as a node where messages will be introduced to the system and through which messages and signaling data concerning the messages will be routed. Alternatively, the messages can be routed through the system via a packet broadcast network which is known to those skilled in the art. While a LAN 40 has been shown as the network element that routes the messages and signaling data throughout the network, any other network element or device capable of routing the messages and/or signaling data may be used in the present invention. For example, an asynchronous transfer mode (ATM) network may be utilized to implemented in the network of FIG. 1 to route the message signals and signaling data throughout the network. ATM networks are a particularly useful embodiment especially when a network such as that depicted in FIG. 1 includes network to network interfaces (NNI), e.g. a LAN to ATM interface as shown, which messages and data must traverse.

ATM networks are known to those skilled in the art and have been adopted as a standard by the International Telecommunications Union (ITU-T). ATM networks are widely employed and make possible the transmission of packet data through packet switching. This provides an efficient and practical transmission medium for transporting data, video and voice services. ATM employs fixed length cells having forty-eight information bytes and five header bytes which contain address information and other functions. The cells are transmitted contiguously on a transmission link and are not identified by their position in relation to a fixed time reference, but by means of address information in the header, thereby defining a "virtual channel" for transmission of the cells. ATM transmission is "asynchronous" in the sense that the cells carrying a particular address, i.e. those cells in a particular virtual channel, may appear at irregular intervals in the cell stream. ATM transport offers a flexible transfer capability that is common to a broad range of services with widely varying traffic patterns and may be employed on many different types of transmission media operating at widely varying rates.

In a preferred embodiment, a signal monitoring application 50 is in communication with DX 200 network elements (NE's) via a LAN. Signal monitoring application 50 is operable to collect the messages in accordance with the invention and will have stored therein the appropriate software so that system 10 need not utilize outside, separate or external hardware devices to perform signal monitoring. The signal monitoring application 50 is in communication with a database 60 that stores the signaling messages according to a transaction table to be discussed in more detail below. The database 60 may be a simple file or a relational database.

The centralized software for providing signal monitoring in accordance with the invention preferably resides in backup units which further comprise or form a part of an application, hereinafter referred to as a "SIMO application" running on the processor 50. The SIMO application may be run on a separate computer unit 50 that becomes a part of the system 10 and is in communication with the switches 20 through LAN 40. Moreover, there may be more than one such computer unit 50 in network 10. Software for performing the SIMO application in accordance with the present will be written in the appropriate computer language which runs on processor 50.

In accordance with the SIMO application of the present invention, the control functions of the signaling connection control and the statistical procedures associated with message signaling traffic are implemented centrally by the DX200 NE 20. This preferably achieves an implementation of which results in an unambiguous control of the signaling functions. The following definition and functionality of the messaging communications protocol will be helpful in understanding the techniques of the present invention.

Preferably, network 10 implements a well known common channel signaling (CCS) system communications protocol such as SS7 mentioned above, or a similar or related protocol applicable to the particular telecommunications network in which the network 10 is employed. In such a CCS system, messages are transferred in one or several independent signaling links. The CCS also transfers message traffic related to signaling network management. In accordance with the invention, signaling message collection based on triggers is coded into a CCS function.

The signaling network protocols are a function of the particular switches 20 which are implemented in system 10. In a preferred embodiment, the protocols are a function of DX200 switches which have been described above, although it will be recognized by those skilled in the art that the particular protocols to be used may be changed in accordance with the use of other switches in network 10. Moreover other switches 25 available from other vendors which are connected to DX200 can also be monitored in accordance with the present invention. These functions are expressed in data words for the messages and appear in message fields that include a Message Transfer Part (MTP), Signaling Connection Control Part (SCCP), Transaction Capabilities Application Part (TCAP), and all other control and statistical functions connected with them.

After the user decides to collect signaling information from the network 10, the user starts the SIMO application at a remote location, although the SIMO application can also be performed locally. The SIMO application runs on a computer unit 50 which could be an ordinary PC, workstation, etc., and connects to a DX200 network element 20 through LAN 40 or some other similar broadcasting network. Message capturing triggers are then passed to a DX200 network element.

The MTP offers a reliable means of transmission between the users belonging to the CCS system. The SCCP complements the services of the MTP in the implementation of hard-wired and wireless network services. These services include dial tone, call back, call waiting, voice mail and other services typically provided by a telephone network. The SCCP can be used to control logical signaling connections, and to transfer signaling messages over the CCS network either by using a logical signaling connection or without using a logical signaling connection. The CCS of the present invention is capable of handling data transmission which takes place primarily between processors. Its transfer capacity is therefore much greater than that of conventional signaling systems, and it can also be used for other types of signaling. The centralized signaling systems of the present invention thus require less hardware than the conventional ones, especially if the number of circuits between the switches or nodes is great.

A destination point code (DPC) indicates to which signaling point a signaling message is to be received. The MTP transfers the signaling messages of all user parts, backs up message transfer, and carries out tasks associated with the design of the CCS network. The OPC is the part of signaling message that identifies the message originating point in the signaling network, while a service information octet (SIO) includes the eight bits that are included in the message signal unit and that form the service indicator and the sub-service field. The service indicator connects the signaling information to a specific user part, and is used only in message signal units. The sub-service field contains the network indicator.

The signaling connection is a logical connection between two network elements which can be used for mutual data transmission. This data field of a message utilizes the signaling connection and includes a signaling information field (SIF) that contains the message signal units that are used to transfer information related to a specific user function. SIF information always contains a routing label. The SIF communicates with a node in the network called the signaling point (SP), which can transmit and receive signaling messages and acts as a signaling transfer point.

The signaling point code (SPC) is a distinguishable signaling point identifier within a given signaling network and consists of 14 or 24 bits. The length of the SPC varies from one network to the other. The signaling link terminal is a combination of hardware and software associated with the signal monitoring capabilities of the invention which is further used to implement the signaling channel operations in the CCS system. In the DX200 network element, the signaling link terminal implements the terminal functions related to the signaling message transfer of one or several signaling links. DX200 may also contain several other signaling link terminals.

In a preferred aspect of the invention a signaling link set is formed by signaling links directly connecting two signaling points in network 10. This further defines a set of signaling routes which are a chain of signaling link sets and signaling transfer points that can be used as a path by the signaling point when routing a message towards a specific signaling point in network 10. Thus, a signaling route set is a combination of all the signaling routes that may be used to pass signaling messages from a signaling point to a specific signaling point in the network 10.

Once the inventive SIMO application is started and signal capturing triggers are passed to the DX200 NE, when the signaling message is received a signaling transfer point forwards the received messages to a destination point indicated in an address field of the message and to the SIMO application if the trigger conditions have been met. Signaling transfer points are links that carry signaling traffic between signaling points. Signaling transfer points can also function as signaling points themselves.

In accordance with SIMO of the present invention, a "user" is a telephony application which utilizes the services of the transaction capabilities of network 10. A "transaction" is a logical connection formed by the transaction capabilities application parts (TCAP) for each dialog between users. The TCAP is a part of the transaction capabilities, which provides the applications with a defined part of the services of the network 10. When wireless network services are used, no additional services are provided and thus the TCAP directly uses the network services provided by the SCCP.

The transaction is used to transfer components belonging to a dialog between the users of the network. At the beginning of a transaction, application protocol data units related to the control of the dialogue can also be transmitted between TCAPs. A transaction identifier (ID) is used to distinguish different transactions between the TCAPs of different signaling points.

The SIMO application of the present invention is operable to store the collected signaling information in database 60 in various ways. The signaling information can be stored either to a binary file or to a relational database. Relational databases are known in the art and may be purchased commercially and customized, or designed explicitly for use in accordance with the present invention. For example, the SQL database available from the International Business Machines Corp., Armonk, N.Y. may be integrated with computer unit 50 to implement the systems and methods of the present invention. Other relational databases are known to those skilled in the art and are usable in the present invention. Relational databases offer many benefits compared to traditional ways of message viewing and interpreting. Using a relational database, tracing one particular call is very simple and message sequences can be displayed callwise which make them much easier to interpret. Certain bit patterns can be sought out in this fashion and the whole call can be easily backtraced and examined rather easily. This is useful for example when tracing faults. If signaling information is stored to a file it can be converted to a relational database or ASCII file at a later time.

The SIMO application of the present invention is preferably divided in two parts. First, the signaling information is retrieved and then it is viewed. Retrieving handles the connection to the DX200 SIMO interface and asks the DX200 to perform signal monitoring based on the triggers. Signal viewing may be implemented for example using JAVA, or some other object oriented language.

Signal message capturing in accordance with the present invention is based on specific signaling triggers that are passed to a DX200 network switch or other equivalent switch. Desired signaling messages between two signaling points are captured and forwarded via LAN (packet broadcasting network) to the SIMO application in a multipoint to single point fashion. Signaling messages are then stored in relational database or file 60. It will be appreciated that it is possible to combine signaling information from different network elements. This will be particularly useful when examining, for example, inter-MSC handover in a wireless system.

DX200 network switches have integrated therein two processes, denoted CCSEND and CCRECE, which take care of the gathering of signaling messages. The processes CCRECE and CCSEND with DX200 switch 20 go over the signaling traffic between the switch element 20 and whenever a signaling message having matching triggers is detected, the signaling messages are duplicated and forwarded over LAN 40 to the SIMO application. When the computer unit 50 running the SIMO application receives the forwarded signaling messages, it saves them to relational database 60 or some other simple file as was described above. The signaling messages may then be viewed. It will be recognized by those with skill in the art that the aforementioned DX200 processes are unique to the preferred DX200 switch used in conjunction with the present invention. However, if other switches are to be used then other switch processes may be integrated with the inventive methods and systems and that the inventive methods and systems are easily adaptable to any such switches. It will be appreciated that the use of the DX200 switch and DX200 processes are simply the best mode for practicing the invention known to the inventors at the present time.

Monitoring is done at the MTP protocol layer. SIF and SIO functions of a message signaling unit (MSU) found in the switch are the monitored and examined fields in the message. The routing label of the SIF, i.e. values of the OPC, DPC and circuit identification code (CIC) can act as triggers for the signal message capturing by the DX200 NE. The value for the SIO is preferably used for the triggering condition. When trigger conditions are met, the CCRECE/CCSEND processes send a message to a collector process, which is interfaced to the inventive SIMO application. If the signal message is corrupted, the MTP receives a notification from the MTP protocol layer and the SIMO application is informed that a signaling message was discarded.

Thus, in accordance with the invention, there is no need to attach any additional hardware to the physical signaling links. The signaling links themselves are not actually monitored, but signaling between signaling points regardless of the physical signaling route or particular network element is accomplished. Moreover, in accordance with the invention centralized signal monitoring is accomplished since it is not necessary to attach a separate signal monitoring device to different nodes in the network to perform signal monitoring.

Figure 2:
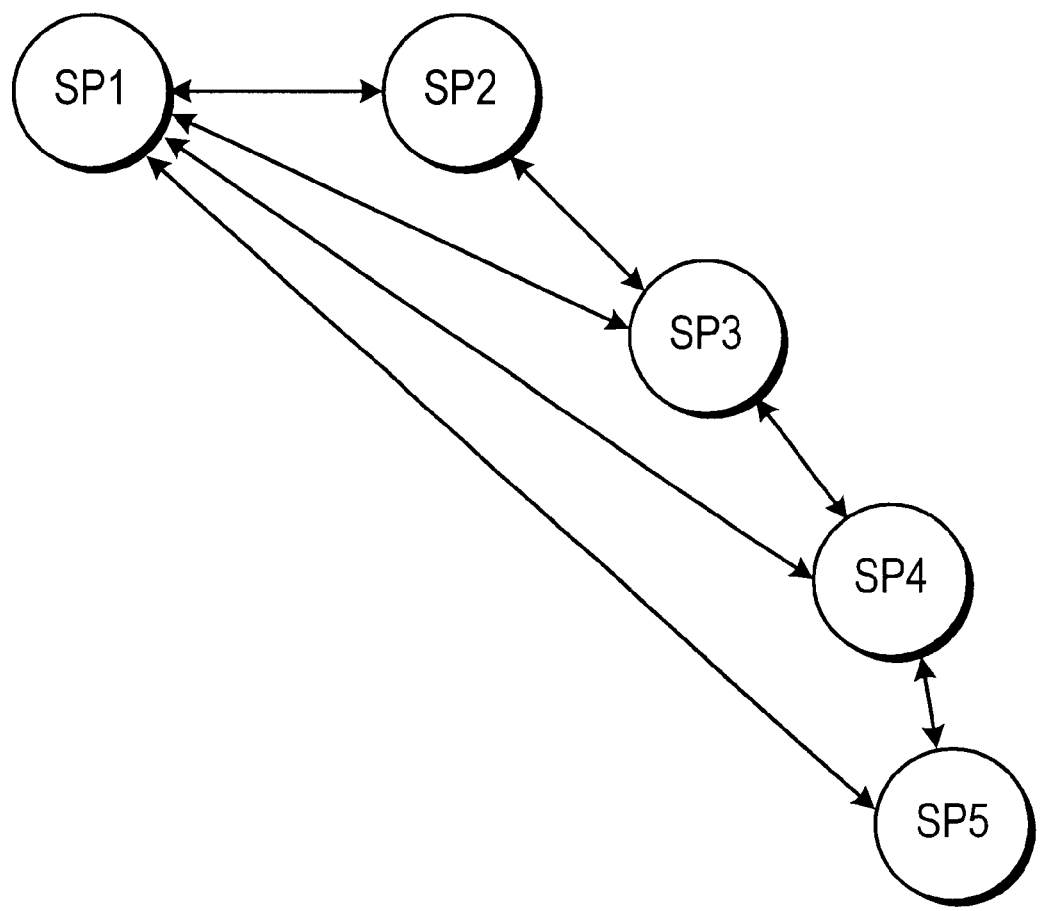
FIG. 2 depicts a state diagram of signal messaging routes achieved in accordance with the present invention.

The actual monitoring is done inside of the signaling point which makes it possible to monitor logical signaling links; a function which is not possible in the prior art monitoring routines where monitoring particular physical links is mandated because signaling messages can only be chosen from various signaling routes and there is no way to know which link the message actually travels to in the next signaling point. As used herein, the term "logical links" or "logical level" of the signaling points means that the routes between two signaling points are independent of each other. This is illustrated in FIG. 2 where, for example, it might be desired to collect signals between SP1 and SP5, which are nodes in the network 10. In this case the following triggers must be set: OPC=SP1 and DPC=SP5 at the SP1, and vice-versa at the SP5. It is immaterial which physical signaling routes the messages use. In prior art signal monitoring, the rather tedious problem of attaching analyzers to all the physical links exists. At the very least, an enormous amount of data would then have to be gathered, reduced and analyzed. This is clearly undesirable and greatly increases the costs of prior art signal monitoring methods. The present invention advantageously alleviates this and other problems.

After the messages have been transferred via LAN they are stored in relational database 60, which makes it possible to view messages in different ways. The messages are referenced so that they can be stored in database 60 relationally which makes them easier to view and allows the common elements of messages to be viewed simultaneously without cluttering the database 60. Accordingly, the messages are preferably stored in the database 60 by a transaction table which breaks the message into a message table for storage in the database. The transaction table of the present invention preferably comprises a set of parameters that will allow the transaction to table to parse the message for referencing according to particular elements of the message. In this fashion, the transaction table can reference all the monitored messages and reference common elements of the messages according to the same parameter or parameters in the transaction table. Those skilled in the art will recognize that any group of parameters with which it is desired to reference the monitored messages may be input to the transaction table depending only upon the particular types of messages traversing the system. Moreover, the parameters may be modified, added, deleted or otherwise changed in the transaction table according to the particular application and needs of the SIMO application of the present invention.

Figure 3:
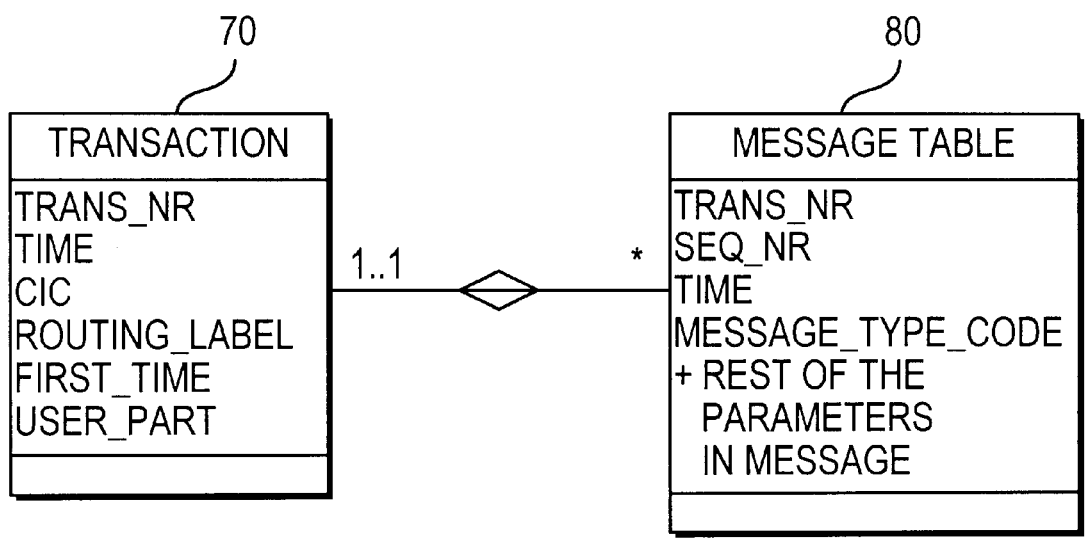
FIG. 3 depicts a block diagram of a preferred transaction table in accordance with the present invention.

FIG. 3 depicts a preferred embodiment of the transaction/message table relationship which is set-up by the inventive SIMO application. The transaction is placed in a database table 70 which contains all the information related to a single message traversing the network 10. A concomitant message table 80 contains all the parameters in the message. The Trans_Nr is a unique integer number used as an identification for a certain call transaction and is further reserved when a new routing label has been recognized. Similarly, the parameter Seq_Nr is a running sequence integer for keeping track with the messages within a call transaction.

The Time parameter is a time stamp of the message and the CIC is the circuit identification code which identifies which circuit or node in the system the message was received from. The Routing_Label is a binary coded OPC and DPC and the Message_type_code identifies the type of message which has been monitored. Finally, the First_time field denotes the time when the first message related to the particular transaction of interest occurred and the User_part is the user definition made by the SIO. Actually there can be over 30 different messages, depending of the user-part used and messages can have different parameters. The message table is really a generic name for tables messages such as IAM, AUM, etc. as defined in ITU-T specification Q.763 for ISUP signaling The results of utilizing the inventive SIMO application of the present invention with the above type of transaction table is that it is possible to track all messages related to a single transaction on the basis of a single message. All the messages within a transaction relate to the transaction table 70 and so it is possible to access the database 60 and discover all the messages which relate to that transaction. Furthermore, by monitoring several logical links in the network 10, the message traffic will be quite large, so in accordance with the inventive methods and systems it is possible to gather many messages related to a transaction and process them accordingly which greatly reduces computational time and expense. Moreover, the inventive methods and systems allow near instant viewing of the messages since they are logically linked by the parameters in the transaction table.

While there have been shown and described certain novel features of the invention as applied to preferred embodiments thereof, it will be that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same result are within the scope of the invention.

Substitutions of elements from one described embodiment to another are also fully intended and contemplated. It is the intention, therefore, to be limited only as indicated by the scope of the claims appended hereto.

We claim:

1. A method of signal monitoring of a message signal at a signaling point in a communications system, comprising the steps of connecting a processor running a signal monitoring application to the signaling point through a communication network; and monitoring, by the processor running the signal monitoring application, the message signal at the signaling point at a logical level of the signaling point.

2. The method of claim 1, further comprising the step of referencing the message signal according to parameters set out in a transaction table to process the message signal.

3. The method of claim 2, further comprising the step of determining whether the trigger condition for the message signal has occurred and capturing the message signal for message signal processing if the trigger condition has occurred.

4. The method of claim 3, further comprising the step of collecting and storing message signaling information relating to the message signal traversing the signaling point.

5. The method of claim 1, further comprising the steps of determining whether the trigger condition for the message signal has occurred and capturing the message signal for message signal processing if the trigger condition has occurred.

6. The method of claim 5, further comprising the steps of collecting and storing message signaling information relating to the message signal traversing the signaling point.

7. A method of signal monitoring of a message signal at a signaling point in a communications system, comprising the steps of:
   monitoring the signaling point at a logical level of the signaling point;
   referencing the message signal according to parameters set out in a transaction table to process the message signal;
   determining whether the trigger condition for the message signal has occurred and capturing the message signal for message signal processing if the trigger condition has occurred;
   collecting and storing message signaling information relating to the message signal traversing the signaling point; and
   storing the referenced message signal in a database having stored therein other message signals which have been similarly referenced according to the transaction table when a trigger condition has occurred for the other message signals.

8. The method of claim 5, wherein the referencing step further comprises the step of breaking up the message signal into a message table for storage in the database.

9. The method of claim 6, wherein the database is a relational database.

10. The method of claim 7, wherein the determining step further comprises setting the trigger for the message signal and storing the message signal in the relational database.

11. The method of claim 8, wherein the transaction table contains all information related to a single message traversing the system and the message table is operable to contain all parameters related to the message signal.

12. The method of claim 9, wherein the collecting step further comprises monitoring centrally the signaling point, thereby alleviating a need to provide more than one signaling point to perform signal monitoring.

13. The method of claim 10, wherein the signaling point is a switch.

14. The method of claim 11, wherein the communication system is a telecommunication system.

15. A method of signal monitoring of a message signal at a signaling point in a communications system, comprising the steps of:
   referencing the message signal according to parameters set out in a transaction table to process the message signal;
   determining whether the trigger condition for the message signal has occurred and capturing the message signal for message signal processing if the trigger condition has occurred;
   collecting and storing message signaling information relating to the message signal traversing the signaling point; and
   storing the referenced message signal in a database having stored therein other message signals which have been similarly referenced according to the transaction table.

16. The method of claim 15, wherein the referencing step further comprises the step of breaking up the message signal into a message table for storage in the database.

17. The method of claim 16, wherein the database is a relational database.

18. The method of claim 17, wherein the determining step further comprises setting the trigger for the message signal and storing the message signal in the relational database.

19. The method of claim 18, wherein the transaction table contains all information related to a single message traversing the system and the message table is operable to contain all parameters related to the message signal.

20. The method of claim 19, wherein the collecting step further comprises monitoring centrally the signaling point, thereby alleviating a need to provide more than one signaling point to perform signal monitoring.

21. The method of claim 20, wherein the monitoring step comprises monitoring the signaling point at a logical level of the signaling point.

22. The method of claim 21, wherein the signaling point is a switch.

23. The method of claim 22, wherein the communication system is a telecommunication system.

24. The method of claim 21, wherein the communications system comprises a processor and further comprising the steps of monitoring a message signal at the signaling point and forwarding signaling information between the processor and the signaling point via a packet broadcasting network.

25. The method of claim 21, further comprising the step of forwarding signaling information about the messages via an asynchronous transfer mode network.

26. A communication system including at least one signaling point to be monitored at a logical level of the signaling point, comprising a processor running a signal monitoring application connected to a communication network, said processor being in communication with the at least one signaling point through communication network for performing signal monitoring of a signaling message at a logical level of the signaling point.

27. The communication system of claim 26, further comprising a database for collecting and storing the signaling data regarding the state of the messages, wherein the signaling point determines if a trigger condition has occurred and if so forwards the signaling message to the processor which references the signal according to parameters set out in a transaction table.

28. A communication system including at least one signaling point to be monitored at a logical level of the signaling point, comprising:

a processor in communication with the signaling point for performing signal monitoring of a signaling message at a logical level of the signaling point;

a database for collecting and storing the signaling data regarding the state of the messages, wherein the signaling point determines if a trigger condition has occurred and if so forwards the signaling message to the processor which references the signal according to parameters set out in a transaction table; and a message table in communication with the transaction table, wherein the processor further references the signal by breaking up the message signal into the message table for storage in the database.

29. The communication system of claim 28, wherein the signaling messages are forwarded to the processor via a packet broadcasting network.

30. The communication system of claim 29, wherein the database is a relational database.

31. The communication system of claim 30, wherein the processor sets the trigger for the message signal and stores the message signal in the relational database.

32. The communication system of claim 31, wherein the transaction table further comprises all information related to a single message traversing the system and the message table comprises all parameters related to the message signal.

33. The communication system of claim 32, wherein the signaling point comprises a switch element.

34. A network element in a communication system for monitoring signal messages comprising an element for monitoring a signaling point wherein messages are stored and collected to the element, the element comprising a database for collecting and storing the signaling data regarding the state of the messages, wherein the signaling point determines if a trigger condition has occurred and if so forwards the signaling message to the element which references the signal according to parameters set out in a transaction table; and a message table in communication with the transaction table, wherein the processor further references the signal by breaking up the message signal into the message table for storage in the database.

* * * * *